June 4, 1935.　　　J. LEDWINKA　　　2,003,546
RAIL CAR TRUCK
Filed April 5, 1932　　4 Sheets-Sheet 1
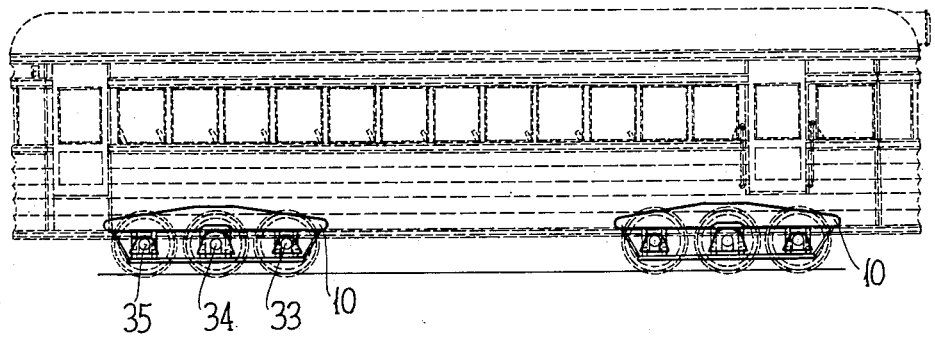
FIG.1
FIG.5
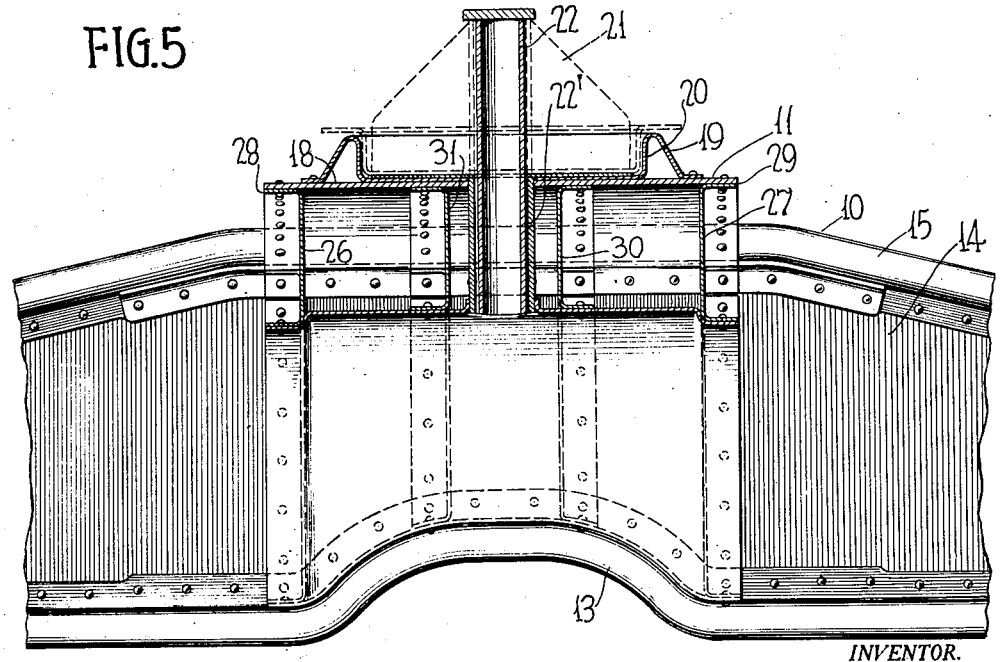
INVENTOR.
JOSEPH LEDWINKA.
BY John P. Tarbox
ATTORNEY.

June 4, 1935.  J. LEDWINKA  2,003,546
RAIL CAR TRUCK
Filed April 5, 1932  4 Sheets-Sheet 2
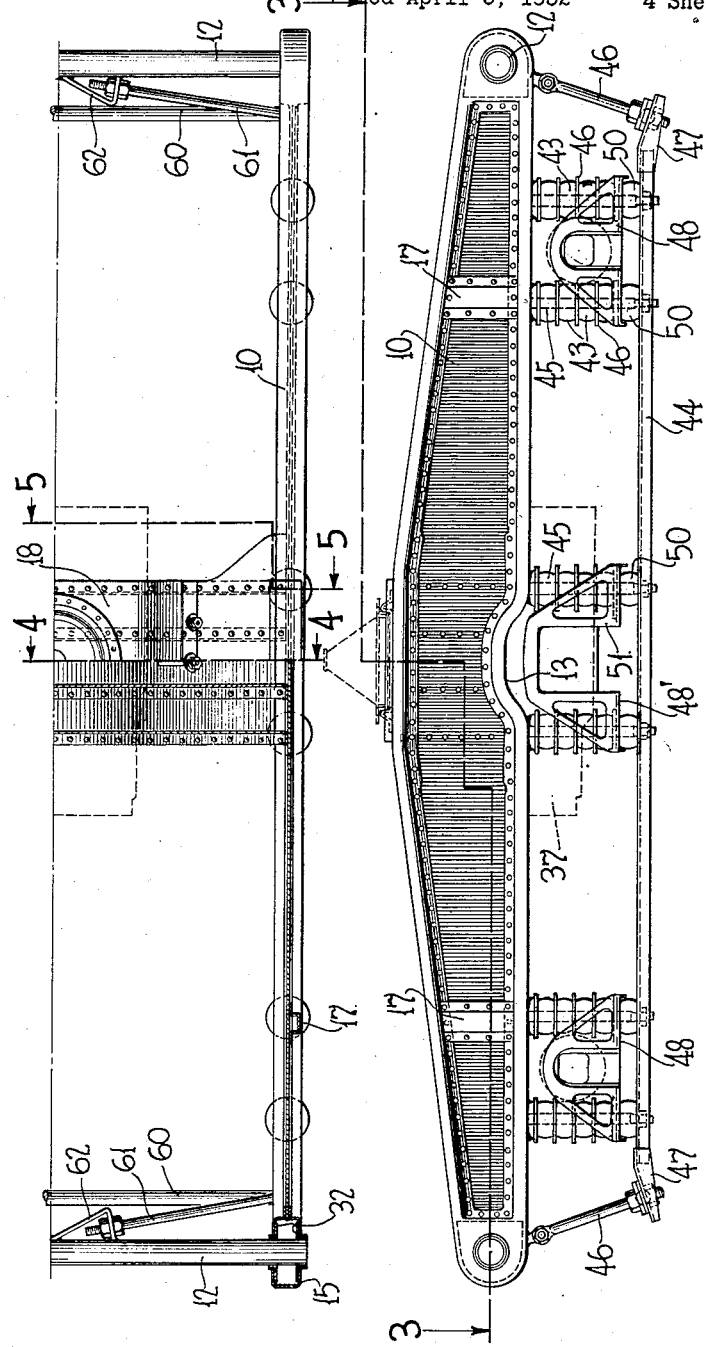
INVENTOR.
JOSEPH LEDWINKA.
BY
John P. Barbor
ATTORNEY.

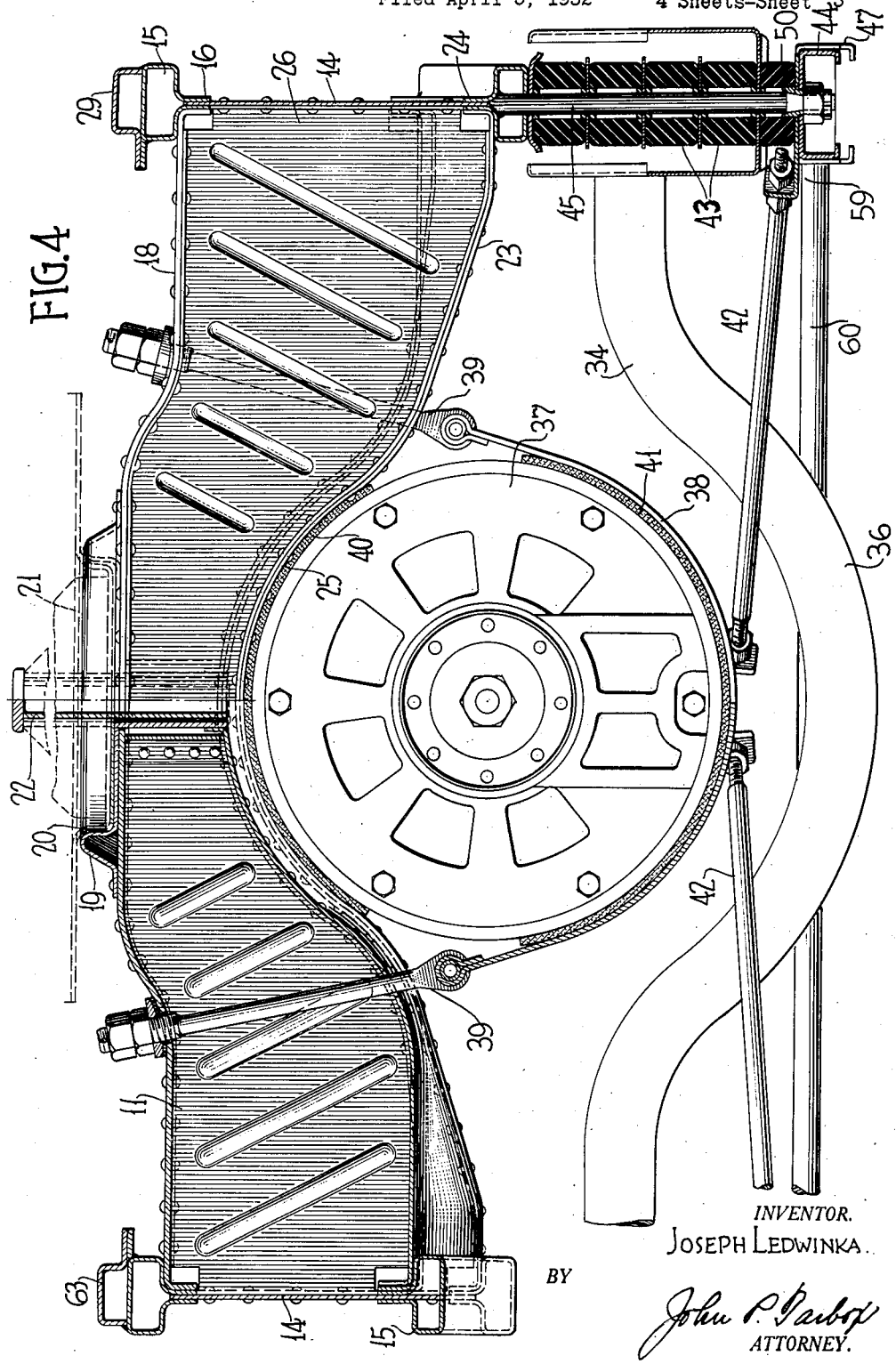
June 4, 1935.  J. LEDWINKA  2,003,546
RAIL CAR TRUCK
Filed April 5, 1932    4 Sheets-Sheet 3
INVENTOR.
JOSEPH LEDWINKA
BY
John P. Barbox
ATTORNEY.

June 4, 1935.  J. LEDWINKA  2,003,546
RAIL CAR TRUCK
Filed April 5, 1932  4 Sheets-Sheet 4

INVENTOR.
JOSEPH LEDWINKA.
BY
John P. Tarbox
ATTORNEY.

Patented June 4, 1935

2,003,546

UNITED STATES PATENT OFFICE 2,003,546

RAIL CAR TRUCK

Joseph Ledwinka, Philadelphia, Pa., assignor to Edward G. Budd Manufacturing Company, Philadelphia, Pa., a corporation of Pennsylvania Application April 5, 1932, Serial No. 603,243

8 Claims. (Cl. 105—196)

The invention relates to rail car truck and more particularly to the construction and suspension of such truck frames from the wheels and axles.

It is among the objects of the invention to provide a truck of this class which is very light in weight, simple of construction, and in which the springs, axles and drive can be readily assembled and disassembled, the parts being readily accessible, and which may be suspended from the wheels and axles without the use of heavy coil or other metallic springs. The truck of the invention is particularly adapted for use with a light weight vehicle body and power plant, supported from the rails on wheels equipped with pneumatic tires, although it will be understood that a number of the features thereof are capable of use in other types of rail cars.

The objects of the invention are attained in large measure by constructing the frame of the truck out of sheet metal parts so shaped and contoured, and of such cross section, as to obtain a maximum of strength with a minimum of weight, and the parts of which can be readily assembled by riveting or welding operations. The frame is suspended from the axles by a rubber block suspension which cushions the shocks due to irregularities in the track, the suspension being arranged below the main body of the frame where it is readily accessible. The side frames are connected by a strong central box section beam of sheet metal parts and tubular end connections, the whole being transversely and diagonally braced by suitable light weight brace rods.

Other and further objects and advantages and the means whereby they are attained will become apparent from the following detailed description when read in connection with the drawings and detail description following.

In the drawings,

Fig. 1 shows in side elevation a rail car equipped with trucks according to the invention.

Fig. 2 shows on a larger scale and in side elevation a side of a frame and suspension devices of a truck according to the invention.

Fig. 3 is a plan view of one half of the truck of Fig. 2, part being shown in section as indicated by the line 3—3 of Fig. 2.

Fig. 4 is a detail transverse vertical sectional view on an enlarged scale taken substantially on the right hand half on the line 4—4 of Fig. 3 and on the left hand side on a line corresponding to line 5—5 of Fig. 3 but on the opposite side not shown in Fig. 3.

Fig. 5 is a detail vertical longitudinal sectional view on the same scale as Fig. 4 taken substantially on the center line of the truck.

Figures 6, 7:
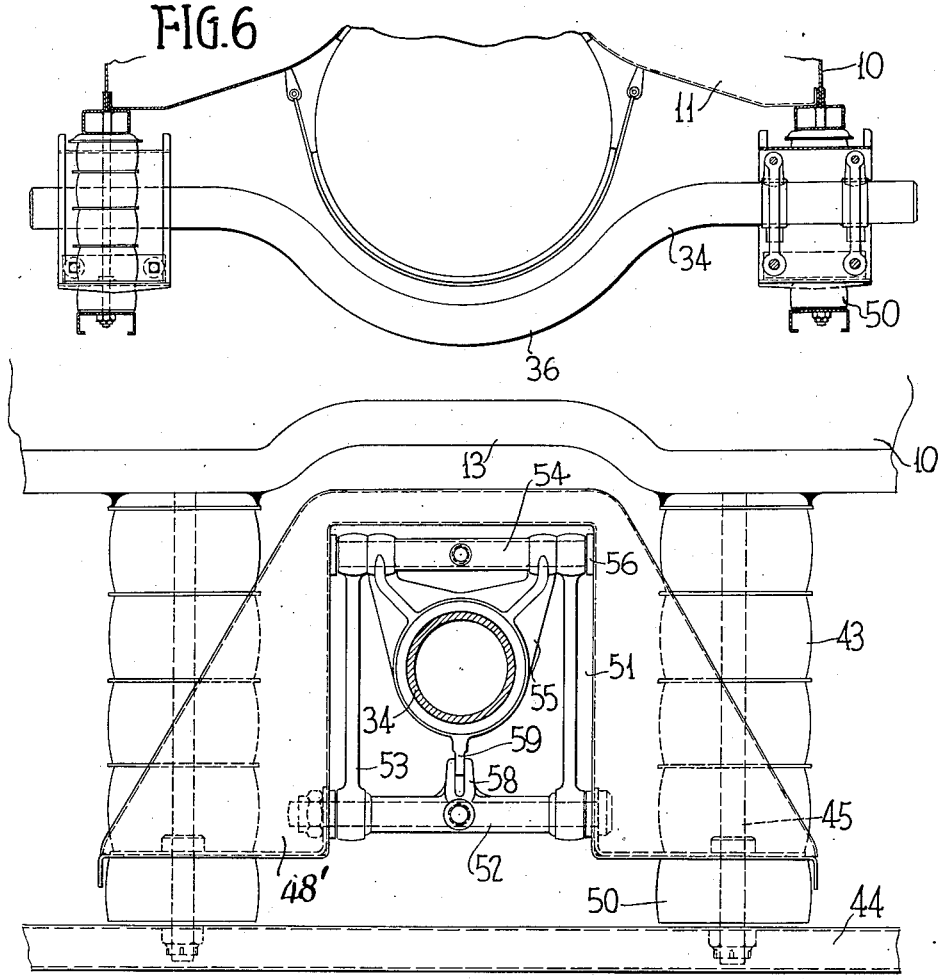
Figs. 6 and 7 are detail views, Fig. 7 being on an enlarged scale, showing the manner of suspension from the intermediate axle.

In the illustrated form of the invention, the main truck frame comprises the side beams 10 and a central cross beam 11 and end tubes 12 connecting the side beams.

The side beams each have substantially straight lower faces except at the center where the lower faces have upwardly offset portions 13 for a purpose which will presently appear. These beams are of greatest depth in their central portions and taper in their upper surfaces toward the ends, thus providing an arched upper surface.

Each beam is built up of a sheet metal web portion 14 see Fig. 4, strongly reinforced in its margins by a closed box section reinforce 15 flanged at 16 and secured through these flanges to the margins of the web portion, by welding or riveting. In the structure shown they are riveted together. Thus an extremely light yet strong beam is provided. The beams may be additionally reinforced by vertical reinforcements (see Figs. 2 and 3) which may be of box section and formed by securing flanged channels 17 to the web portion 14. In the drawings, two such reinforcements are shown located some distance from the ends of the beam.

The central cross beam 11 is a wide beam likewise built up out of sheet metal, having a top plate 18 arched upwardly and flattened in its central portion, and to this flat raised central portion is secured the socketed plate 19 within the socket 20 of which the block 21 carrying the pivot pin 22 of the body structure is adapted to turn. The pin 21 is tubular and extends down into a tubular bearing 22' welded to the top and bottom plates of the beam 11. The ends of the top plate 18 are flanged and secured to the upper reinforced margins of the side beams 10. The bottom plate 23 is similarly flanged at 24 and secured to the bottom reinforced margins of the side beams. At the ends the bottom plate is given a contour in transverse section corresponding to the recessed under face of the side beams, and at the central portion it is upwardly arched at 25 to provide a recess for a purpose to be presently described.

The top and bottom plates of the beam 11 are connected by side plates 26 and 27 which are flanged outwardly at 28 and 29, respectively, and secured to the margins of the top and bottom plates to form a box section beam. Additional reinforcing plates 30 and 31 are, however, secured in place inwardly of the margins of the top and bottom plates before the side plates are secured in place. These plates form with the side and top plates a multi-cell box section structure. The ends of all of the plates 26, 27, 30 and 31 are flanged and secured to the web portions 14 of the side beams.

Thus a strong but relatively light weight transversely arched beam is provided upon which the weight of one end of the body rests and through which it is transmitted to the side beams and finally to the axles and wheels in a manner to be presently described.

The end cross members of the frame comprise the end tubes 12 which are extended through the box section marginal reinforce 15 which may be reinforced at these end joints by interior reinforcing plates 32. The tubes 12 are welded in place.

The truck according to the invention is adapted to carry three axles, 33, 34, 35, two adjacent the ends and one in the middle. Where the wheels of the truck are driven, as in the illustrated embodiment, the end axles 33 and 35 are adapted to carry the driven wheels and the central axle 34 is a dead axle, and is bent downwardly at 36 intermediate its ends to afford clearance for the motor 37 which drives the end axles and is secured in place in the upwardly arched recess 25 in the cross beam 11 by a sling 38 having its ends secured through the bolts 39 to the cross beam. Suitable cushioning pads 40 and 41 are preferably arranged between the motor and the beam and the motor and the sling, respectively, before the sling is tightened by means of nuts on the bolts 39. The bottom of the sling and through it the motor is braced fore and aft and transversely by the diagonal bracing bars 42.

The truck frame is suspended from the axles through a novel and improved cushioned suspension comprising axle guiding and supporting means including rubber blocks 43 arranged between the axle and the main frame side beams and between the axles and auxiliary side bars 44, one suspended below each side beam 10.

Each side bar may comprise a downwardly facing channel suspended from its associated side beam 10 by a plurality of vertical bolts 45 and inclined end bolts 46. A pair of vertical bolts is associated with each axle, the axle being arranged between the members of the pair.

The ends of the bars are extended in a downwardly inclined direction by channel brackets 47, extending substantially at right angles to the inclined end bolts 46.

The ends of the axles are supported in brackets 48, 48' shown in side elevation in Fig. 2 and in cross section, in the case of the central axle bracket in Fig. 4. By reference to these figures it will be seen that these brackets are substantially U-shaped in cross section and extend laterally on both sides of the axle beyond the adjacent bolts 45, the bolts passing through holes in the bottom of the U and serving to guide the axle in its vertical movement with respect to the frame.

The axles are cushioned with respect to the load on the frame through a plurality of rubber blocks 43 surrounding the bolts 45 and arranged between the bottom of the U-shaped brackets supporting the axles and lower faces of the side beams 10, these rubber blocks being spaced from each other by metal washers 46. The holes in the rubber blocks are larger than the diameter of the bolts and they are held in spaced relation from these bolts by small spacing washers at their opposite ends fitting within the ends of the holes of the blocks. This arrangement avoids sliding contact of the rubber blocks with the bolts and prolongs their life.

The series of rubber blocks 43 thus serve the same purpose as the usual heavy coiled or leaf springs of metal, and give smoother riding. To take any rebound, a similar but smaller cushioning means is provided between the axles and the bars 44. This may consist, as shown, of but a single rubber block 50 arranged on each bolt 45 between the bottoms of the axle supporting brackets 48, 48' and the bars 44.

Thus the relative vertical movement of the axles and truck frame is guided through the brackets rigidly secured to the axles and the bolts 45 rigidly secured to the frame and cushioned in both directions through the intermediary of the rubber blocks 43 and 50.

In a truck of this kind carrying more than two axles it is desirable, and in fact necessary to obtain smooth operation around sharp curves in the track to make at least one of the axles floating to a limited extent to permit movement of the axle in an axial direction in rounding a curve. By the invention, such movement is provided for in connection with the intermediate dead axle 34 and the construction by which this is accomplished is shown in Figs. 6 and 7.

To this end the brackets 48' supporting this axle are in detail constructed differently from the other axle brackets 48, each being formed with a central rectangular recess 51 opening downwardly. The side walls of the bottom of this recess are connected by a bolt or bar 52. Adjacent the ends of this bar 52 are pivotally supported the links 53 which, in turn, pivotally support a bar 54 from their upper ends from which the axle 34 is supported by a bracket 55. The ends of the bar 54 loosely engage transverse guide plates 56 which are secured to the side walls of the rectangular recess 51 and the bracket 55 supporting the axle has a projection 59 adapted to slide between the walls of a transversely extending U-shaped projection 58 fixed to the bar 52. From the construction just described it will be seen that the axle is capable of limited axial floating movement through the pivotal connections just described, and is suitably guided in such movement, but that it is incapable of rotating, this for the purpose of taking care of the torque set up in braking where the brake drum is secured to the axle, as usual.

The offset portions 13 in the bottom of the side beams take care of the clearance necessary for the free vertical movement of the axle 34.

Brackets 59 secured through the bolts 45 adjacent the axle 34 to the side bars provide a connection for the diagonal rods 42 interbracing the motor sling 38 and motor and the side bars 44. At the ends the side bars are interbraced by cross rods 60 and to the main frame by the diagonal bolts 61 interconnecting the side bars and the brackets 62 welded to the tubular cross members 12 of the main frame.

Centrally of the side beams 10 are secured by welding to their top faces, downwardly facing channel section pieces 63 forming raised bearing plates, flat in their upper faces, for the sides of the body superstructure (not shown).

While a specific embodiment of the invention has been described, it should be understood that many changes may be made therein without departing from its main features within the scope of the appended claims.

What I claim is:

1. In a rail car truck, a side beam extending over all the axles and comprised of a main body web of sheet metal continuous from end to end and a marginal reinforce for said web of hollow box section form.

2. In a rail car truck, side beams extending over all the axles and comprised of a main body web of sheet metal continuous from end to end and a marginal hollow section reinforce and connected centrally by a cross beam of box cross section built up of sheet metal parts.

3. In a rail car truck, side beams extending over all the axles and comprised of a main body web of sheet metal continuous from end to end and a marginal reinforce and connected centrally by an arched cross beam of hollow box cross section of substantially the depth of the adjacent portions of the side beams.

4. In a rail car truck, side beams of pressed metal and a central hollow section transversely arched cross beam built up of pressed metal connecting the side beams, the bottom of said cross beam being arched more than the top to provide a curved recess to receive a motor.

5. In a rail car truck, side beams and a central cross beam connecting said side beams intermediate their ends and arched upwardly in its under side to provide a seat for a motor, and a sling for suspending the motor from the cross beam connected to the opposite sides of said beam.

6. In a rail car truck, an axle, a frame supported therefrom, and means floatingly supporting said frame from the axle to permit limited sidewise movement of the frame with respect to the axle, said means comprising spaced bars above and below said axle, one of said bars being supported in the frame and the other of said bars on the axle, means pivotally connecting the bars, and means cooperating with the ends of the bar on the axle and extending between the axle and the bar supported in the frame for guiding the frame in the axial floating movement thereof with respect to the axle.

7. In a rail car truck, a side beam extending over all the axles and comprised of a main body web of sheet metal continuous from end to end, and a marginal reinforce of hollow box section form having a pair of marginal flanges overlapping the opposite sides of said web and secured thereto.

8. In a rail car truck, a side beam extending over all of the axles and comprising a main body web of sheet metal continuous from end to end and a marginal reinforce for said web of hollow box section form, said web being centrally reinforced by a bolster structure of the height of the beam having its adjacent end secured to said web, and additional reinforcing members extending the height of the beam and secured to said web at points intermediate said central reinforce and the ends of the beam.

JOSEPH LEDWINKA.